United States Patent [19]

Horiki et al.

[11] Patent Number: 4,835,026

[45] Date of Patent: May 30, 1989

[54] MASKING MEMBER

[75] Inventors: Seinosuke Horiki; Reiji Makino, both of Tokai; Hisami Iwata, Toyota, all of Japan

[73] Assignees: Nagoya Oilchemical Co., Ltd.; Toyota Jidosha Kabushikikaisha, both of Aichi, Japan

[21] Appl. No.: 268,055

[22] Filed: Nov. 7, 1988

Related U.S. Application Data

[63] Continuation-in-part of Ser. No. 876,695, Jun. 20, 1986, abandoned.

[30] Foreign Application Priority Data

| | | | |
|---|---|---|---|
| Jun. 27, 1985 | [JP] | Japan | 60-097812 |
| Jul. 31, 1985 | [JP] | Japan | 60-117880 |
| Sep. 26, 1985 | [JP] | Japan | 60-146892 |

[51] Int. Cl.[4] .......................... B32B 3/26; B32B 3/30; B32B 7/12

[52] U.S. Cl. .......................................... 428/40; 428/43; 428/159; 428/167; 428/172; 428/178; 428/198; 428/314.4; 428/317.3; 428/317.7; 428/318.8; 428/352

[58] Field of Search .................... 428/40, 43, 158–160, 428/163, 167–169, 172, 173, 178, 198, 309.9, 314.4, 314.8, 317.1, 317.3, 317.7, 318.6, 318.8, 343, 352, 355, 356

[56] References Cited

U.S. PATENT DOCUMENTS

| | | | |
|---|---|---|---|
| 2,292,024 | 8/1942 | Dreher | 428/317.3 |
| 3,595,729 | 7/1971 | Cook | 428/318.4 |
| 3,619,344 | 11/1971 | Wolinski et al. | 428/317.7 |
| 4,061,825 | 12/1977 | Counsell et al. | 428/355 |
| 4,226,915 | 10/1980 | Ijima et al. | 428/492 |
| 4,393,080 | 7/1983 | Pawelchak et al. | 428/355 |

FOREIGN PATENT DOCUMENTS

| | | | |
|---|---|---|---|
| 747341 | 11/1966 | Canada | 428/317.1 |
| 936232 | 9/1963 | United Kingdom | 428/167 |
| 1128177 | 9/1968 | United Kingdom | 428/43 |
| 1232358 | 5/1971 | United Kingdom | 428/158 |

*Primary Examiner*—William J. Van Balen
*Attorney, Agent, or Firm*—Cooper & Dunham

[57] ABSTRACT

A masking member for use in a spray coating process comprising a molded foamed polystyrene panel having a thickness A, said polystyrene panel having a closed cell structure, a density in the range 12.5–50 g/l, a layer of emulsion-type adhesive formed on one side of said panel, a release sheet covering said adhesive layer, said panel being provided with grooves formed on one or both sides of said panel, when said grooves are formed on both sides of said panel the grooves are directly opposite each other, said grooves having a depth such that the thickness of the polystyrene panel beneath or between said opposed grooves is in the range about 0.30–0.85 A, is presented. When said masking member is used, said release sheet is removed from said adhesive layer and said masking member is snapped along said grooves by hand to a piece having a size corresponding with a part of an article which is necessary to be protected from a surface treatment. Said piece is attached to said part to protect it from said surface treatment by said adhesive layer thereof.

8 Claims, 6 Drawing Sheets

MASKING MEMBER

This invention is a continuation-in-part of application Ser. No. 876,695 filed June 20, 1986, now abandoned.

FIELD OF THE INVENTION

The instant invention relates to a new masking member used to protect a part of the surface of an article from a spray coating. More particularly, the instant invention relates to a new masking member for use in a spray coating process comprising a molded foamed polystyrene panel having a thickness A, said polystyrene panel having a closed cell structure, a density in the range 12.5–50 g/l, a layer of emulsion-type adhesive formed on one side of said panel, a release sheet covering said adhesive layer, said panel being provided with grooves formed on one or both sides of said panel, when said grooves are formed on both sides of said panel the grooves are directly opposite each other, said grooves having a depth such that the thickness of the polystyrene panel beneath or between said opposed grooves is in the range about 0.30–0.85 A.

DESCRIPTION OF THE PRIOR ART

A spray coating is very difficult to coat locally on the surface of an article since such coating material is spread when said coating material is sprayed from a spray gun. Therefore, a masking member is necessary to protect part(s) of the surface of said article to be protected from said coating.

Hitherto, adhesive tapes have been used as a masking member to protect a part of the surface of an article from said spray coating. Namely, said adhesive tapes are attached to a part of the surface of an article to protect it from said spray coating, and after said spray coating, said adhesive tapes are removed from the part of the article. Said part is not affected by said spray coating since said part was covered with said adhesive tapes during said spray coating.

Nevertheless, said adhesive tapes as the masking member have faults wherein a case where the part to be protected from said spray coating is wide, it is troublesome to attach said adhesive tapes to the part to be protected and to remove said adhesive tapes from said part since a number of strips of said adhesive tapes must be attached to said part to cover the whole part, and further, in a case where said adhesive tapes are subjected to heat, said adhesive tapes stick to the part due to heating and the stripping of said adhesive tapes becomes very difficult. Said difficulty of attaching and removing of the masking member to/from the part to be protected may be a very serious problem, particularly for a continuous spray coating process in a mass-production system such as the spray coating process for a car body, electric utensils and the like.

SUMMARY OF THE INVENTION

Accordingly, an object of the instant invention is to save trouble when the masking member is attached/removed to/from said part.

Briefly, said object of the instant invention can be attained by a new masking member for use in a spray coating process comprising a molded foamed polystyrene panel having a thickness A, said polystyrene panel having a closed cell structure, a density in the range 12.5–50 g/l, a layer of emulsion-type adhesive formed on one side of said panel, a release sheet covering said adhesive layer, said panel being provided with grooves formed on one or both sides of said panel, when said grooves are formed on both sides of said panel the grooves are directly opposite each other, said grooves having a depth such that the thickness of the polystyrene panel beneath or between said opposed grooves is in the range about 0.30-0.85 A. When said masking member is used, said release sheet is removed from said adhesive layer and said masking member is snapped along said grooves by hand to a piece having the proper size corresponding with a part of an article which is necessary to be protected from a surface treatment.

A further object of the instant invention is to prevent the adhesive layer from soaking into the panel since said panel consists of foamed polystyrene and the adhesive layer is formed by coating an emulsion type adhesive having a slow drying speed. Said object of the instant invention can be attained by a primer layer being an intermediate layer between said panel and the adhesive layer.

Still a further object of the instant invention is to easiliy snap said masking member along said grooves to a piece having a proper size corresponding with a part of an article which is necessary to be protected from a surface treatment. Said object of the instant invention can be attained by putting cutting lines in the release sheet.

BRIEF DESCRIPTIONS OF THE DRAWINGS

DETAILED DESCRIPTION

FIG. 1 to FIG. 4 relate to a first embodiment of the instant invention. Referring now to FIG. 1 to FIG. 4, a masking member(100) comprises a panel(101) consisting of foamed polystyrene made by bead molding and having closed cells. Checkered grooves(102) are formed at regular intervals on both sides of said panel(101), and an adhesive layer(103) is formed on a side of said panel(101) and said grooves(102) are formed directly opposite each other. Said adhesive layer(103) is covered with a release sheet(104) such as a polyethylene film, a polypropylene film, a release paper, and the like to prevent sticking to another article, hands of workers, and the like when the masking member is handled, one placed upon another, transported, and the like. Said grooves may be formed when the panel is molded or by cutting after the panel is molded or cut out.

Figure 1:
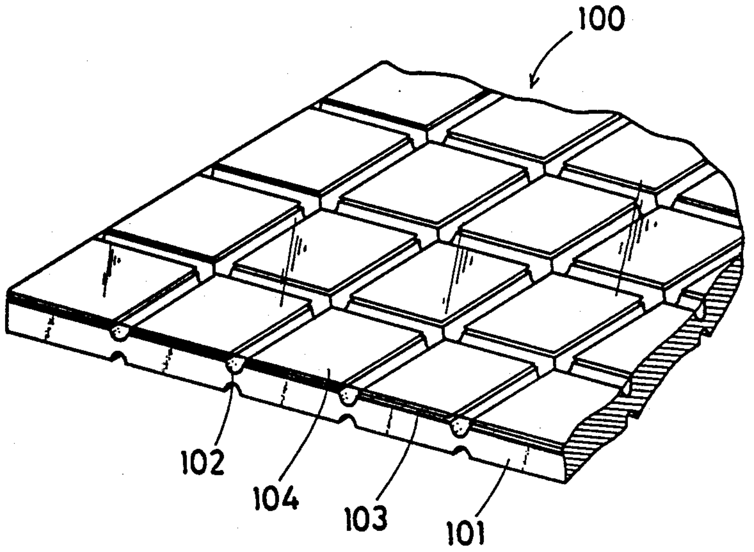
FIG. 1 is a partial perspective view of a first embodiment of the instant invention.
Figure 2:
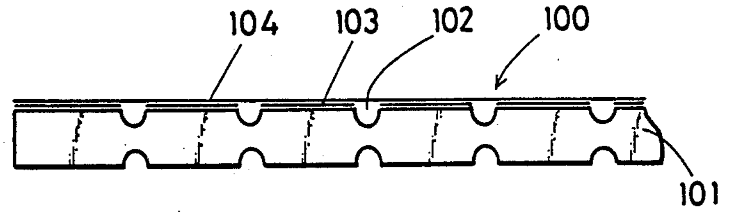
FIG. 2 is a partial side sectional view of a first embodiment of the instant invention.
Figure 3:
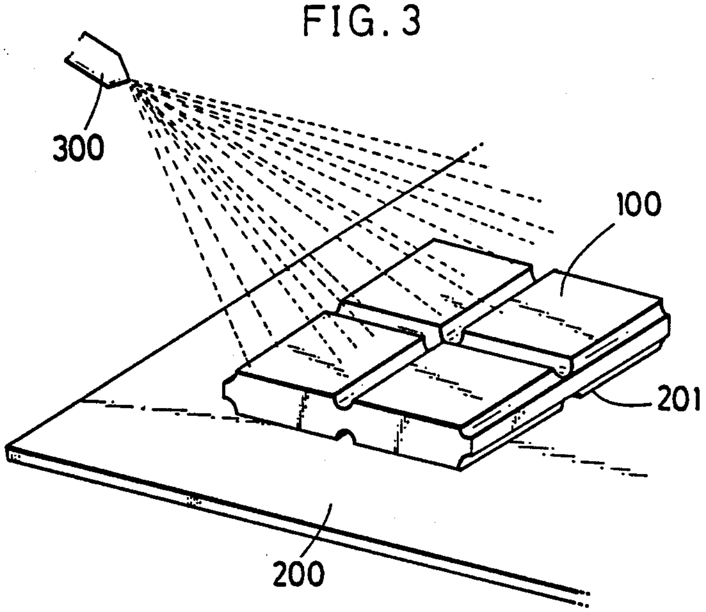
FIG. 3 is a partial perspective view of a first embodiment of the instant invention in the case of coating.

When the masking member(100) is used, the release sheet(104) is removed from the adhesive layer(103) and the panel(101) is snapped along the grooves by hand to a piece having the proper size corresponding with a part(201) of an article(200) which is necessary to be protected from a surface treatment such as coating, plating, phosphatizing and the like. The resulting piece is then attached to said part(201) of the surface of said article(200) by said adhesive layer(103) thereof as shown in FIG. 3.

Figure 4:
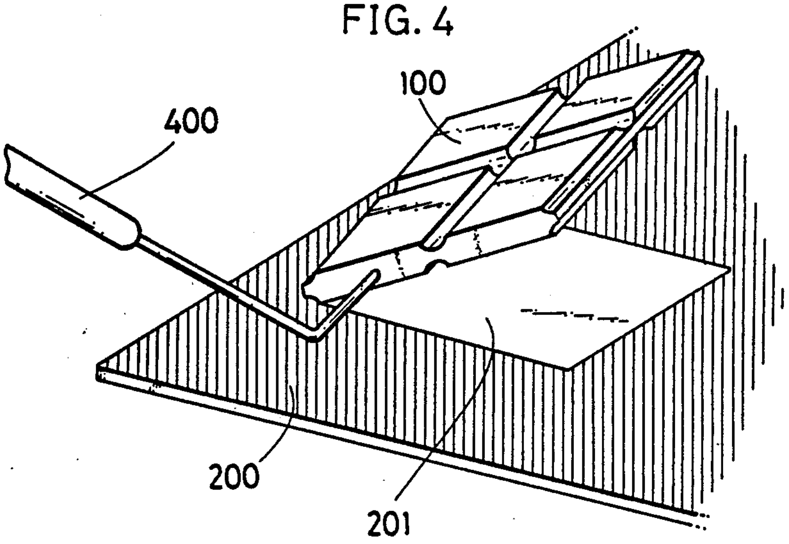
FIG. 4 is a partial perspective view of a first embodiment of the instant invention in the case of removing the masking member from the article.

Paint is sprayed from a spray gun(300) on the surface of said article(200). The said part(201) of the surface of said article(200) is not subjected to said paint since said part(201) is covered with said piece of the masking member (100). After painting, said painted article(200) is heated to dry and/or cure if desired. After or before said heating, said piece is stripped by a hook(400), as shown in FIG. 4, or by hand or in a case where the heating temperature is higher enough than the softening point of the plastic used as the material of said panel(101), said piece will shrink by said heating and come off by itself from said part(201) of said article(200).

Said formed polystyrene is made by bead molding and has closed cells and further, the density of said foamed polystyrene should be in the range 12.5 to 50 g/l and said grooves have a depth such that the thickness B of the polystyrene panel beneath or between said opposed grooves is in the range about 0.30–0.85 A, wherein A is a thickness of said foamed polystyrene panel. Said foamed polystyrene panel having closed cells may be very easily snapped along the grooves of hand since said foamed polystyrene is very brittle and the cell walls of said closed cells of said foamed polystyrene adhere weakly to each other. Nevertheless if the density of said foamed polystyrene is less than 12.5 g/l and the thickness B is less than 0.30 A, the masking member may be easily broken along said grooves during operations such as transportation, storage, and the like and if the density of said foamed polystyrene is more than 50 g/l and the thickness B is more than 0.85 A, it may be difficult to snap said masking member along said grooves. Said adhesive layer(103) should be formed by coating an emulsion-type adhesive since said masking member comprises a foamed polystyrene panel having poor solvent-resistance and said emulsion-type adhesive contains only water as a solvent.

Figure 5:
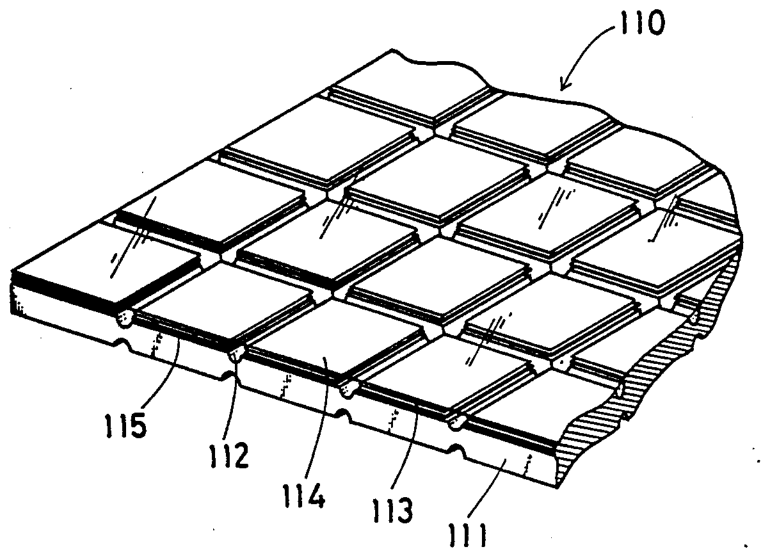
FIG. 5 is a partial perspective view of a second embodiment of the instant invention.
Figure 6:
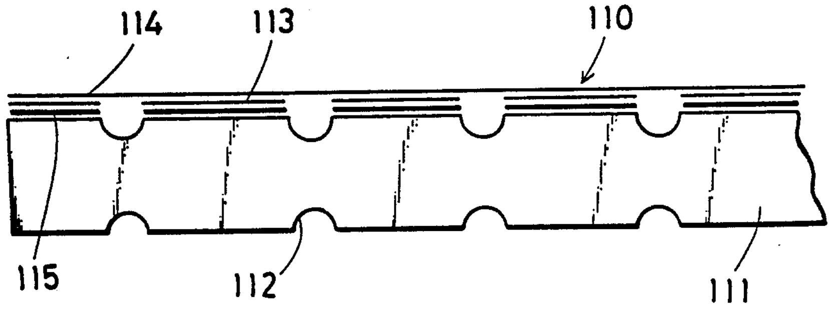
FIG. 6 is partial side sectional view of a second embodiment of the instant invention.

FIG. 5 and FIG. 6 relate to the second embodiment of the instant invention. Referring now to FIG. 5 and FIG. 6, a masking member(110) comprises a panel(111) consisting of foamed polystyrene, the same as the first embodiment and grooves(112), the same as the first embodiment are formed on both sides of said panel(111). A primer layer (115) is formed on a side of said panel(111) and an adhesive layer(113) is formed on said primer layer(115). Said adhesive layer(113) is covered with a release sheet(114), the same as the first embodiment. Said primer layer(115) prevents said adhesive layer(113) soaking into the panel(111) since said panel(111) consists of foamed polystyrene and the surface of said panel(111) is porous and further, as before mentioned, said adhesive layer is formed by the coating of an emulsion-type adhesive which has a slow drying speed and high penetrating property, and said primer layer(115) is formed by laminating a film of plastic such as, polyethylene, polypropylene, vinylacetate-ethylene copolymer, polyvinylchloride and the like by heating or adhesive, or by coating with an emulsion or a solution of synthetic resin such as acrylic resin, polyvinyl acetate resin, polyethylene, polypropylene, vinyl acetate-ethylene copolymer and the like, on a side of said panel(111). Further, the skin-like layer formed on the surface of said panel(111) sicne said panel(111) is made by bead molding, may also be used as said primer layer(115).

Figure 7:
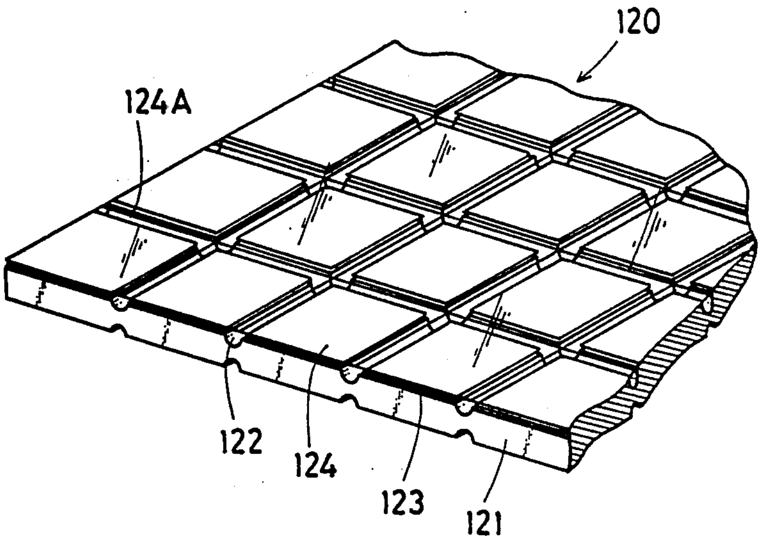
FIG. 7 is a partial perspective view of a third embodiment of the instant invention.
Figure 8:
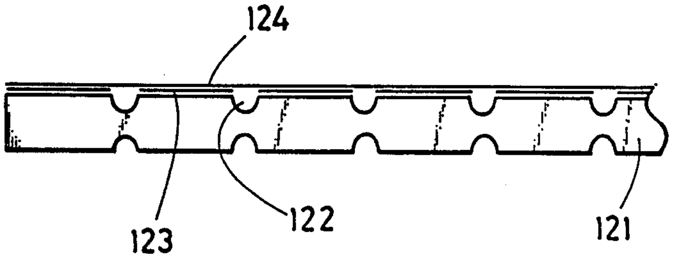
FIG. 8 is a partial side sectional view of a third embodiment of the instant invention.
Figure 9:
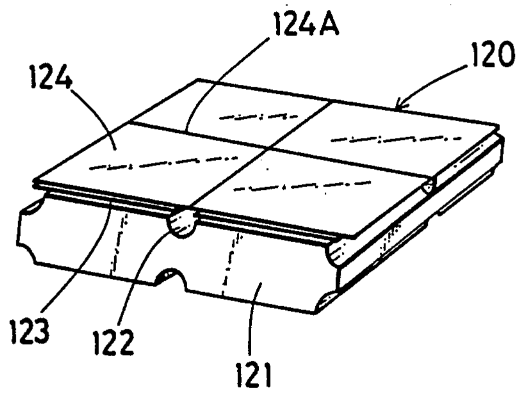
FIG. 9 is a perspective view of a piece of the third embodiment.

FIG. 7 to FIG. 9 relate to the third embodiment of the instant invention. Referring now to FIG. 7 to FIG. 9, a masking member(120) comprises a panel(121) consisting of foamed polystyrene the same as the first and second embodiments, and grooves(122), the same as the first and second embodiments, are formed on both sides of said panel(121). An adhesive layer(123) is formed on a side of said panel(121) and said adhesive layer(123) is covered with a release sheet(124). Cutting lines(124A) along the grooves(122) of said panel(121) are formed in the release sheet(124).

Figure 10:
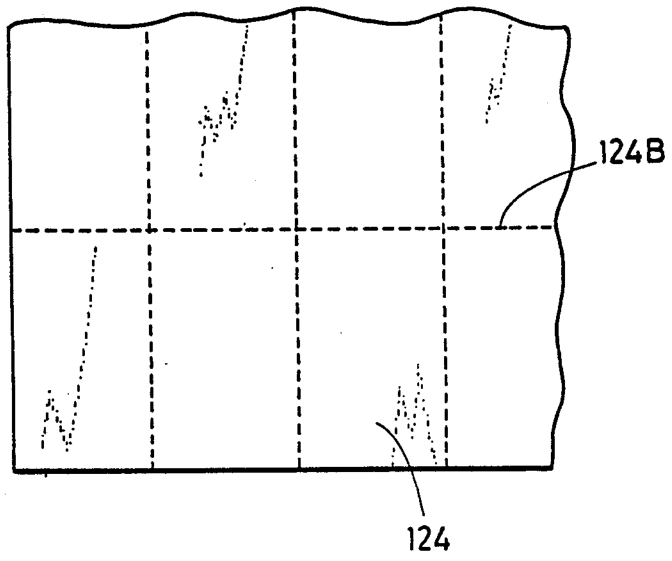
FIG. 10 is a plane view of another embodiment of the release sheet having cutting lines.
Figure 11:
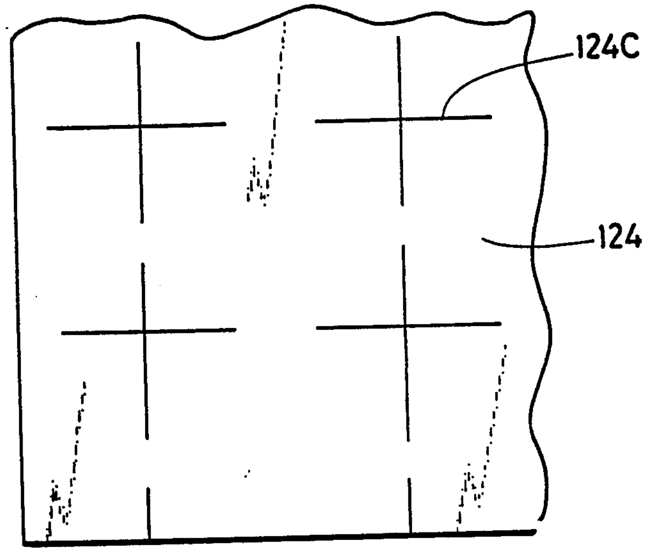
FIG. 11 is a plane view of further embodiment of the release sheet having cutting lines.

When the masking member(120) is used, said panel (121) is snapped along said grooves(122) by hand to a piece (121A) having a size corresponding with a part of the surface of an article and at the same time, said release sheet(124) is easily snapped along the cutting lines(124A). Said cutting lines may include perforated lines(124B) as shown in FIG. 10 and discontinuous lines(124C) as shown in FIG. 11.

We claim:

1. A masking member for use in a spray coating process comprising a molded foamed polystyrene panel having a thickness A, said polystyrene panel having closed cell structure, a density in the range 12.5–50 g/l, a layer of emulsion-type adhesive formed on one side of said panel, a release sheet covering said adhesive layer, said panel being provided with grooves formed on one or both sides of said panel, when said grooves are formed on both sides of said panel the grooves are directly opposite each other, said grooves having a depth such that the thickness of the polystyrene panel beneath or between said opposed grooves is in the range about 0.30–0.85 A.

2. A masking member of claim 1, wherein said foamed polystyrene panel is provided with grooves on both sides and said grooves are formed directly opposite each other.

3. A masking member of claim 1, wherein said foamed polystyrene panel is breakable along said grooves.

4. A masking member of claim 1, wherein a primer layer is provided between said panel and said layer to prevent said emulsion-type adhesive from soaking into said panel when said emulsion-type adhesive is coated on one side of said panel to form said adhesive layer.

5. A masking member of claim 1, wherein said masking member is used to mask a car in the spray coating process of cars.

6. A masking member of claim 5, wherein said masking member is used to mask the underside of a car.

7. A masking member of claim 6, wherein a polyvinyl chloride sol is applied by spray coating to the underside of a car.

8. A masking member of claim 1, wherein said masking member is used to mask an electric utensil in the spray coating process of electric utensils.

* * * * *